United States Patent
Brewington et al.

(10) Patent No.: US 9,625,612 B2
(45) Date of Patent: Apr. 18, 2017

(54) LANDMARK IDENTIFICATION FROM POINT CLOUD GENERATED FROM GEOGRAPHIC IMAGERY DATA

(71) Applicant: Google Inc., Mountain View, CA (US)

(72) Inventors: Brian Edmond Brewington, Fort Collins, CO (US); Bryan M. Klingner, Austin, TX (US); David Martin, Oakland, CA (US); Kirk L. Johnson, Boulder, CO (US)

(73) Assignee: Google Inc., Mountain View, CA (US)

( * ) Notice: Subject to any disclaimer, the term of this patent is extended or adjusted under 35 U.S.C. 154(b) by 861 days.

(21) Appl. No.: 14/021,222

(22) Filed: Sep. 9, 2013

(65) Prior Publication Data
US 2015/0073711 A1    Mar. 12, 2015

(51) Int. Cl.
*G01C 21/00*      (2006.01)
*G01D 21/00*      (2006.01)
(Continued)

(52) U.S. Cl.
CPC ........ *G01V 11/00* (2013.01); *G01C 21/3644* (2013.01); *G06K 9/00664* (2013.01);
(Continued)

(58) Field of Classification Search
None
See application file for complete search history.

(56) References Cited

U.S. PATENT DOCUMENTS 7,356,164 B2 *   4/2008   Aliaga ................ G06K 9/6203
                                                         382/103
7,912,637 B2     3/2011   Horvitz et al.
(Continued)

FOREIGN PATENT DOCUMENTS

WO    WO 2013/029674 A1    3/2013

OTHER PUBLICATIONS

Irschara et al., "From Structure-from-Motion Point Clouds to Fast Location Recognition", IEEE Conference on Computer Vision and Pattern Recognition, Miami, Florida, Jun. 20-25, 2009, pp. 2599-2606.
(Continued)

*Primary Examiner* — Edward Cosimano
(74) *Attorney, Agent, or Firm* — Dority & Manning, P.A.

(57) ABSTRACT

Systems and methods for identifying prominent landmarks in a geographic area are provided. More particularly, geographic imagery data, such as panoramic images captured by a camera from a perspective at or near ground level, can be analyzed to identify landmarks depicted in the geographic imagery data. For instance, structure-from-motion techniques can be used to generate a point cloud of tracked features that are located a threshold distance away from one or more camera perspectives associated with the geographic imagery data. Landmarks that are visible from multiple camera perspectives and that are visible from greater distances relative to one or more camera perspectives can be identified as prominent landmarks in a geographic area. A geographic information system can use the prominent landmarks for a variety of purposes, such as for use in providing travel directions, for rendering landmarks in an emphasized style, and/or for constructing/displaying a three-dimensional model of the landmark.

15 Claims, 7 Drawing Sheets

(51) Int. Cl.
*G06F 17/40* (2006.01)
*G06F 19/00* (2011.01)
*G01V 11/00* (2006.01)
*G01C 21/36* (2006.01)
*G06K 9/00* (2006.01)
*G06T 7/00* (2017.01)

(52) U.S. Cl.
CPC ............. *G01C 21/00* (2013.01); *G01D 21/00* (2013.01); *G06F 17/40* (2013.01); *G06F 19/00* (2013.01); *G06K 9/00671* (2013.01); *G06T 7/0042* (2013.01)

(56) References Cited

U.S. PATENT DOCUMENTS

| | | | |
|---|---|---|---|
| 8,364,398 B2 | 1/2013 | Rossio et al. | |
| 8,463,543 B2 | 6/2013 | Waldman et al. | |
| 8,805,091 B1* | 8/2014 | Hensel | 345/629 |
| 8,848,983 B1 | 9/2014 | Brewington et al. | |
| 8,989,506 B1* | 3/2015 | Hensel | G06T 3/4038 |
| | | | 345/629 |
| 9,415,310 B2* | 8/2016 | Martini | G06T 7/0065 |
| 2004/0240707 A1* | 12/2004 | Aliaga | G06K 9/6203 |
| | | | 382/103 |
| 2007/0143345 A1 | 6/2007 | Jones et al. | |
| 2013/0035853 A1 | 2/2013 | Stout et al. | |
| 2015/0172626 A1* | 6/2015 | Martini | G06T 7/0065 |
| | | | 348/50 |
| 2015/0186745 A1* | 7/2015 | Martini | G06T 7/0065 |
| | | | 345/633 |
| 2015/0186746 A1* | 7/2015 | Martini | G06T 7/0065 |
| | | | 382/203 |
| 2015/0187133 A1* | 7/2015 | Martini | G06T 7/0065 |
| | | | 345/420 |
| 2015/0209673 A1* | 7/2015 | Martini | G06T 7/0065 |
| | | | 463/31 |
| 2016/0292867 A1* | 10/2016 | Martini | G06T 7/0065 |

OTHER PUBLICATIONS

Siddharth Choudhary et al: "Visibility Probability Structure from SFM Datasets and Applications", Oct. 7, 2012, Computer Vision ECCV 2012, Springer Berlin Heidelberg, Berlin, Heidelberg, pp. 130-143.

Li S et al: "Selecting distinctive scene features for landmarks", Proceedings of the International Conference on Robotics and Automation Nice, May 12-14, 1992; Los Alamitos, IEEE Comp. Soc. Press, US, vol. Conf. 8, May 12, 1992, pp. 53-59.

Yunpeng Li et al: "Location Recognition Using Prioritized Feature Matching", Sep. 5, 2010, Computer Vision A ECCV 2010, Springer Berlin, Heidelberg, Berlin, Heidelberg, pp. 791-804.

PCT International Search Report for Corresponding PCT Application No. PCT/US2014/051188, Mailed Jan. 28, 2015, 3 Pages.

* cited by examiner

LANDMARK IDENTIFICATION FROM POINT CLOUD GENERATED FROM GEOGRAPHIC IMAGERY DATA

FIELD

The present disclosure relates generally to geographic information systems, and more particularly to identifying prominent landmarks from geographic imagery data.

BACKGROUND

Geographic information systems provide for the archiving, retrieving, and manipulating of data that has been stored and indexed according to geographic coordinates of its elements. A geographic information system generally includes a variety of data types, including imagery, maps, tables, vector data (e.g. vector representations of roads, parcels, buildings, etc.), three-dimensional models and other data. Improvements in computer processing power and broadband technology have led to the development of interactive geographic information systems that allow for the navigating and displaying of geographic imagery, such as map imagery, satellite imagery, aerial imagery, street level imagery, three-dimensional models, and other geographic imagery.

The identification of prominent landmarks in geographic information systems can be used for a variety of purposes. For instance, prominent or highly visible landmarks can be identified for use in providing travel directions. As another example, vector-style maps can use the visual prominence of a landmark to determine whether to render certain landmarks in an emphasized style relative to other landmarks. As yet another example, visual prominence of structures can also be used to identify landmarks that merit the creation of a three-dimensional model representing the landmark in the geographic information system.

SUMMARY

Aspects and advantages of embodiments will be set forth in part in the following description, or may be obvious from the description, or may be learned through practice of the embodiments.

One example aspect of the present disclosure is directed to a computer-implemented method implemented by one or more computing devices for identifying prominent landmarks in a geographic area. The method includes accessing, by the one or more computing devices, geographic imagery data captured from one or more cameras from a perspective at or near ground level and generating, by the one or more computing devices, a point cloud based at least in part on the geographic imagery data. The point cloud includes a plurality of data points. Each of the plurality of data points is associated with a tracked feature in the geographic imagery data. The method further includes identifying, by the one or more computing devices, a subset of data points in the point cloud. Each data point in the subset is located at least a threshold distance away from one or more camera perspectives associated with the geographic imagery data. The method further includes matching, by the one or more computing devices, one or more data points in the subset with a landmark.

Other aspects of the present disclosure are directed to systems, apparatus, non-transitory computer-readable media, user interfaces and devices for identifying prominent landmarks in a geographic area.

These and other features, aspects and advantages of various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to systems and methods for identifying prominent landmarks in a geographic area. More particularly, geographic imagery data, such as geographic images captured by a camera from a perspective at or near ground level, can be analyzed to identify prominent landmarks depicted in the geographic imagery data. Landmarks that are visible from multiple camera perspectives and that are visible from greater distances relative to one or more camera perspectives can be identified as prominent landmarks in a geographic area. A geographic information system can use the prominent landmarks for a variety of purposes, such as for use in providing travel directions, for rendering landmarks in an emphasized style, and/or for constructing or displaying a three-dimensional model of the landmark.

According to particular aspects of the present disclosure, the geographic imagery data can be processed to identify a point cloud of features depicted in the geographic imagery data. In one implementation, a structure-from-motion technique is used to generate the point cloud. The structure-from-motion technique tracks features depicted in the geographic imagery from multiple different camera perspectives and determines the position (e.g. a geographic position) of the tracked features relative to a reference. The point cloud can include a plurality of data points. Each data point can include position information (e.g. latitude, longitude, altitude coordinates, distance to a camera, etc.) and a color or pixel value for the data point. The generation of the point cloud depends on tracked feature points being visible from multiple perspectives. The identified features in the point cloud are therefore distinctive enough to stand out from multiple perspectives.

Once the point cloud has been generated, the point cloud can be filtered to identify a subset of data points in the point cloud that are located a threshold distance (e.g. 0.5 km to 2 km) away from one or more camera perspectives associated with the geographic imagery data. For instance, each of the data points in the subset can be a threshold distance from a camera perspective associated with one of the images/views in the geographic imagery data.

The data points in the subset can be matched with known landmarks and other points of interest. For instance, the position information associated with the data points can be correlated with position information for known landmarks and other points of interest to match the data points with the landmarks. In one particular implementation, a rudimentary clustering of the data points into point clusters can be performed to facilitate matching of the data points to landmarks and other points of interest. The landmarks and other points of interest matched with the data points in the subset can be identified as prominent landmarks in the geographic area.

Identifying features using geographic imagery data that includes images captured by a camera from a perspective at or near ground level (e.g. street level images) can focus on landmarks that are typically visible to individuals as they navigate or otherwise view a particular geographic area. In addition, landmarks identified from geographic imagery data according to example aspects of the present disclosure can be biased towards points that are more distant from a camera perspective and therefore observable by individuals for a longer time. Moreover, the points are distinctive enough to register between nearby view perspectives in the geographic imagery data. As a result, the identified landmarks can be suitable for many applications in a geographic information system. For instance, the identified landmarks can be useful in providing travel directions to a user.

According to one example aspect of the present disclosure, a score can be determined for the identified landmarks based on the visibility of the identified landmarks. The score can be used to prioritize the landmarks in the geographic information system. More particularly, a viewshed can be determined for one or more of the data points or point clusters in the subset. The viewshed for a data point in the subset can be the set of points from which the particular data point or point cluster is visible. In a particular implementation, the viewshed can include the set of camera perspectives associated with the geographic imagery data that view the data point or point cluster. Statistical analysis can be performed on the viewshed to determine a score for a landmark matched with the data point. The score for the landmark can be determined based at least in part on other suitable factors, such as a landmark ranking for the landmark in a geographic information system. In this way, the score can distinguish between highly visible famous landmarks (e.g. a stadium) from other highly visible landmarks (e.g. a radio tower).

Example Geographic Information Systems

Figure 1:
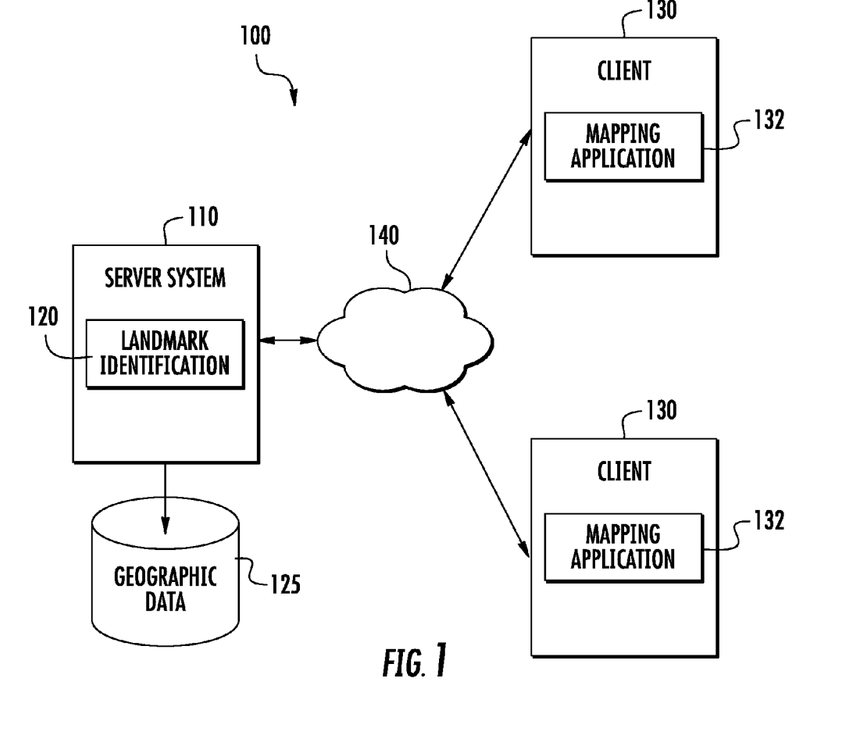
FIG. 1 depicts a geographic information system according to an embodiment of the present disclosure.

FIG. 1 depicts a geographic information system 100 according to an embodiment of the present disclosure. The geographic information system 100 can provide for the archiving, retrieving, and manipulation of geospatial data that has been indexed and stored according to geographic coordinates, such as latitude, longitude, and altitude coordinates, associated with the geospatial data. The system 100 can combine satellite imagery, photographs, maps, three-dimensional models, vector data and other geographic data, and search capability so as to enable a user to view imagery of a geographic area and related geographic information (e.g., locales such as islands and cities; and points of interest such as local restaurants, hospitals, parks, hotels, and schools). The system further allows the user to conduct local searches and to get travel directions to a location or between two or more locations. Results can be displayed in a two-dimensional (2D), two-and-half dimensional (2.5D), or three-dimensional (3D) representation of the area of interest. The user can pan, tilt, zoom, and rotate the view to navigate a representation of the area of interest.

Referring to FIG. 1, the geographic information system 100 can include a client-server architecture, where the server system 110 communicates with one or more clients 130 via a network 140. The network 140 can include any suitable combination of wired or wireless networks, such as the Internet. Although two clients 130 are illustrated in FIG. 1, any number of clients 130 can be connected to the server system 110 over the network 140. While the present disclosure is discussed with reference to a client-server architecture, the inherent flexibility of computer-based systems allows for a great variety of possible configurations, combinations, and divisions of tasks and functionality between and among the components of the system 100. For instance, the systems and methods discussed herein can be implemented using a single computing device or across multiple computing devices in a parallel or distributed computing system.

The server system 110 can include one or more computing devices that can include one or more processors and memory. The memory can store computer-readable instructions that when executed cause the one or more processors to perform operations. The server system 110 can include or can be in communication with one or more databases 125. The one or more databases 125 can store geospatial data to be served or provided to the client 130 over the network 140. The one or more databases 125 can include image data (e.g. digital maps, satellite images, aerial photographs, street level imagery, etc.), non-image data such as tabular data (e.g. digital yellow and white pages), and map layer data (e.g. databases of diners, restaurants, museums, and/or schools; databases of seismic activity; database of national monuments; etc.). The one or more databases 125 can also store information relative to prominent landmarks (e.g. scores and other data) identified according to example aspects of the present disclosure. Geospatial data can be stored in one or more databases 125 or in some other storage facility accessible to server system 110.

The server system 110 can be configured to receive requests for geographic information, and respond to those requests, via the network 140. In one embodiment, the server system 110 encodes the geographic information in one or more data files and provides the files to the requestor. The server system 110 can implement a landmark identification module 120. The landmark identification module 120 can be configured to analyze geographic imagery data to identify prominent landmarks according to example aspects of the present disclosure. Information associated with the prominent landmarks can be used for a variety of purposes, such as for prioritizing landmarks, for providing travel directions, for selecting landmarks for construction of a three-dimensional model, and/or for other purposes.

The client 130 can include one or more computing devices, such as a desktop, laptop, personal digital assistant (PDA), smartphone, tablet, a navigation system, a handheld GPS system, a wearable computing device, a display coupled to one or more processors, or other suitable computing device. The client 130 can include one or more processors and memory. The memory can store computer-readable instructions that when executed cause the one or more processors to perform operations.

In one aspect, the client 130 can implement a mapping application 132 that allows a user to interact with the geographic information system 100. For instance, the mapping application 132 can allow a user to request maps or other geographic imagery, request travel directions, navigate geographic imagery, perform data searches and/or perform other functions. The mapping application 132 can implement or can be implemented in conjunction with an example user interface that presents and receives information from a user, such as a browser.

Note that other modules and components may be included in the system 100 and that illustrated system components may be rearranged. For instance, the one or more databases 125 can be integrated into the server system 110. Other configurations will be apparent in light of this disclosure, and the present disclosure is not intended to be limited to any particular one. Any number of modules can be programmed or otherwise configured to carry out the functionality described herein.

Example Methods for Identification of Landmarks

Figure 2:
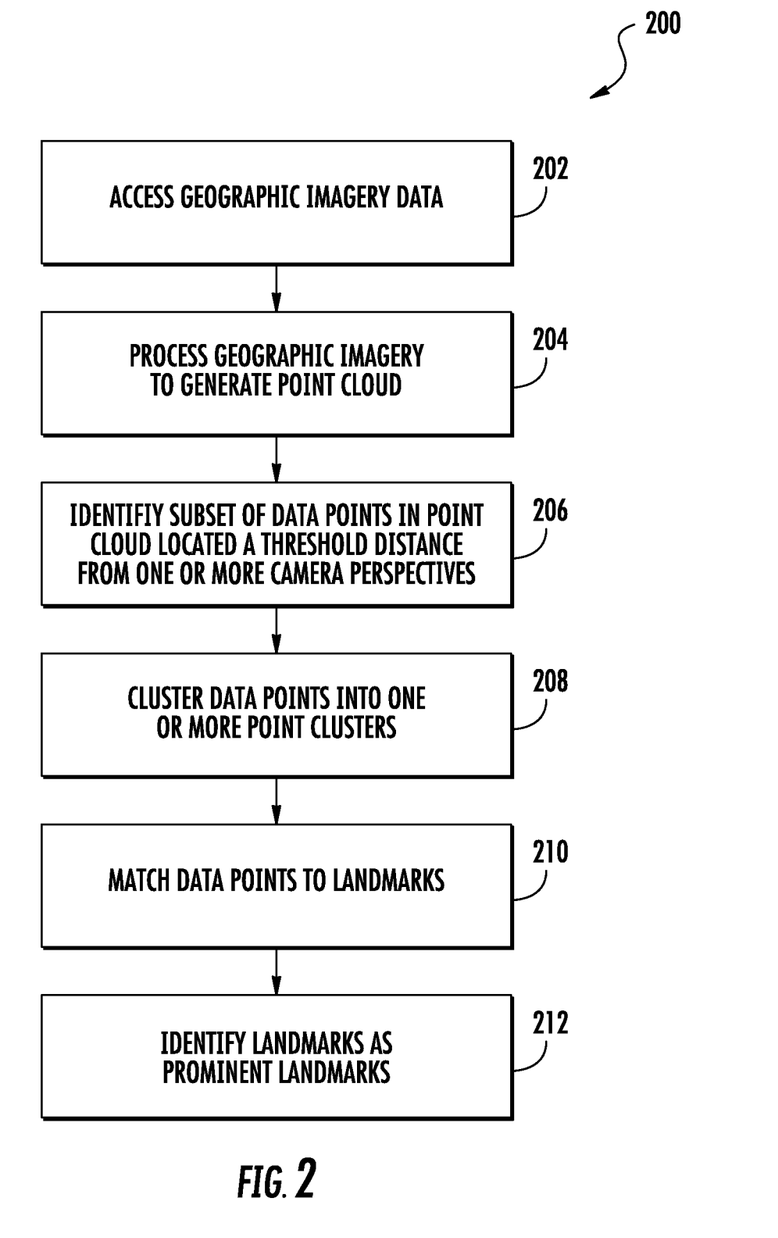
FIG. 2 depicts a flow diagram of a method for identifying prominent landmarks according to an embodiment of the present disclosure.

FIG. 2 depicts a flow diagram of a computer-implemented method (200) for identification of landmarks according to an embodiment of the present disclosure. The method (200) can be implemented by one or more computing devices, such as one or more of the computing devices depicted in FIG. 10. In addition, FIG. 2 depicts steps performed in a particular order for purposes of illustration and discussion. Those of ordinary skill in the art, using the disclosures provided herein, will understand that various steps of any of the methods discussed in the present disclosure can be omitted, rearranged, combined and/or adapted in various ways.

At (202), the method includes accessing geographic imagery data. For instance, geographic imagery data stored in one or more computer-readable media can be accessed. The geographic imagery data can include images of one or more geographic areas of interest from a variety of different camera perspectives. As used in the present disclosure, a camera perspective refers to a location of a camera that captures the imagery. According to particular aspects of the present disclosure, the geographic imagery data can include images of a geographic area captured by a camera from camera perspectives at or near ground level (e.g. within 20 feet of the ground level), such as street level imagery. Although the term "street level" imagery is used, the images can depict non-street areas such as trails and building interiors.

The geographic imagery data can be captured using any suitable image capture device. For instance, street level imagery can be captured by a digital camera mounted on top of a vehicle, from a camera angle pointing roughly parallel to the ground, and/or from a camera position at or below the legal limit for vehicle heights (e.g. 7-14 feet). Panoramic street level imagery can be created by stitching together the plurality of images taken from different camera perspectives. In a particular implementation, the geographic imagery data can be captured using a rolling shutter technique. The geographic imagery data can be stored in one or more computer-readable media as a set of pixels associated with color and brightness values.

Figure 3:
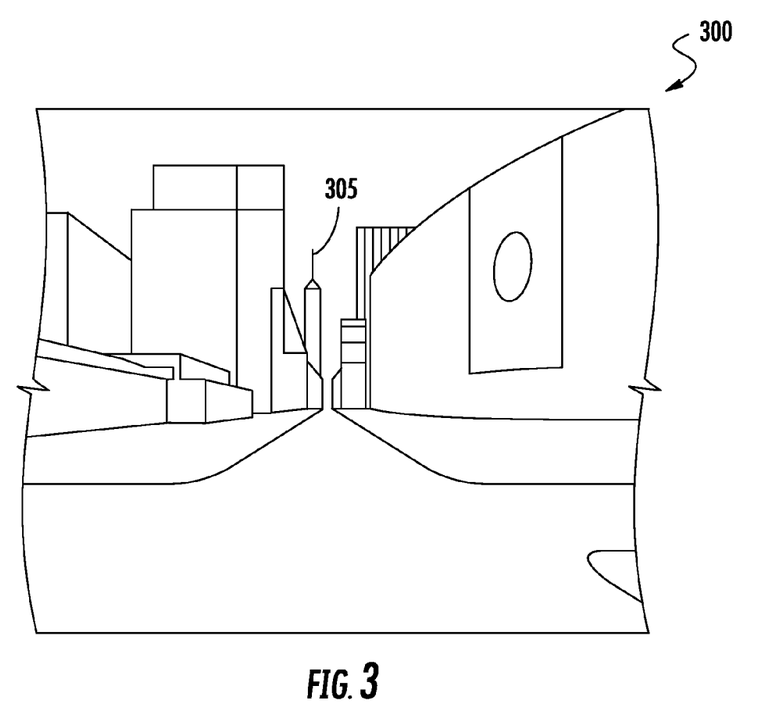
FIG. 3 depicts geographic imagery data captured from a perspective at or near ground level according to an embodiment of the present disclosure.

FIG. 3 depicts example geographic imagery data 300 captured by one or more cameras from a perspective at or near ground level that can be accessed according to an embodiment of the present disclosure. The geographic imagery data 300 includes a portion of a panoramic image of a geographic area from a single camera perspective. The geographic imagery data 300 can include different views of the geographic area (not illustrated) from one or more other camera perspectives. As shown in FIG. 3, the geographic imagery data 300 can depict various landmarks and other points of interest that are visible from a particular camera perspective. For example, the geographic imagery data 300 can depict landmark 305, which is visible from the particular camera perspective associated with the geographic imagery data 300.

The accessed geographic imagery data can include representations of a geographic area from many different camera perspectives. For instance, the geographic imagery data can include a plurality of different street level images captured from different camera perspectives. Accordingly, different features in the geographic imagery data can be depicted at different locations relative to the different camera perspectives. The tracking of these features in the geographic imagery data can be used to identify position information for the features. As will be discussed in more detail below, this position information can be used to identify prominent landmarks in a geographic area.

More particularly at (204) of FIG. 2, the geographic imagery data can be processed to generate a point cloud. The point cloud can include a plurality of data points. Each data point can correspond to a tracked feature in the geographic imagery data. Each data point can provide a three-dimensional position of the feature as well as a color or other pixel value associated with the tracked feature.

In one implementation, a structure-from-motion technique can be used to generate the point cloud. The structure-from-motion technique can identify a plurality of features (e.g. building corners with high image gradients) using a suitable feature detection image processing technique. The feature detection image processing technique can identify features associated with high image gradients (e.g. in terms of color and/or brightness) in the geographic imagery data. The detected features can be tracked across many different camera perspectives in the geographic imagery data. By analyzing the correspondence between features in the geographic imagery data across different camera perspectives, the three-dimensional position relative to some reference of the features can be determined. For instance the latitude, longitude, and altitude of the features and/or distance to the camera perspective can be determined from the geographic imagery data. The three-dimensional position information can be used to generate the point cloud of data points. The camera pose (e.g. position and orientation) of the geographic imagery data for the multiple different camera perspectives can also be determined using structure-from-motion techniques.

Figure 4:
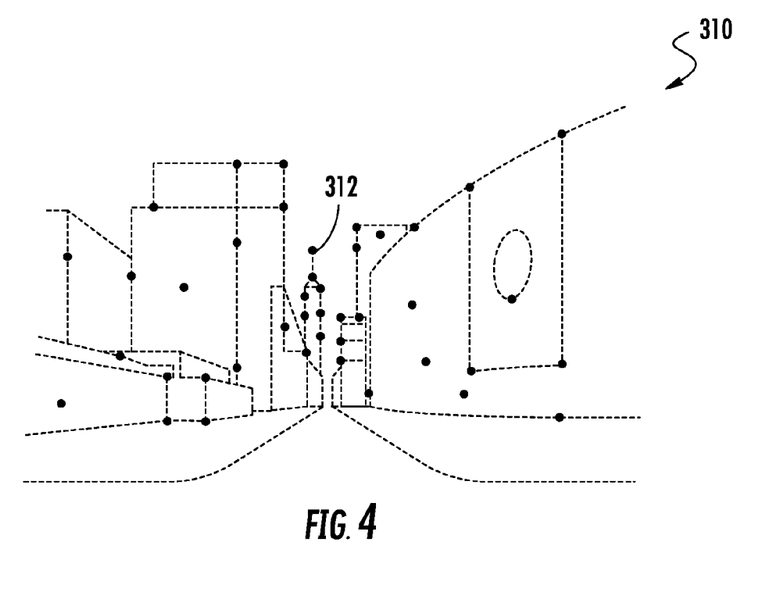
FIG. 4 depicts a point cloud generated from geographic imagery data according to an embodiment of the present disclosure.

FIG. 4 depicts an example point cloud 310 that can be generated from the geographic imagery data 300 of FIG. 3. The point cloud 310 of FIG. 4 includes a plurality of data points associated with different three-dimensional positions in the geographic area depicted in the geographic imagery data 300. Each data point corresponds to a feature tracked in the geographic imagery data. For instance, data point 312 can correspond to a feature tracked across multiple different camera perspectives in the geographic imagery data. In this regard, the data points in the point cloud 310 can be representative of distinctive features visible from multiple different camera perspective in the geographic imagery data.

Referring back to FIG. 2 at (206), a subset of the data points in the point cloud can be identified. Each of the data points in the subset can be located a threshold distance away from one or more camera perspectives in the geographic imagery data. For instance, the distance of each data point to one or more camera perspectives that view the data point can be determined. The data point can be selected for inclusion in the subset if one or more of these distances is greater than the threshold distance. The threshold distance can be set to any suitable value. For instance, in a particular embodiment, the threshold distance can be in the range of 0.5 km to 2 km.

Figure 5:
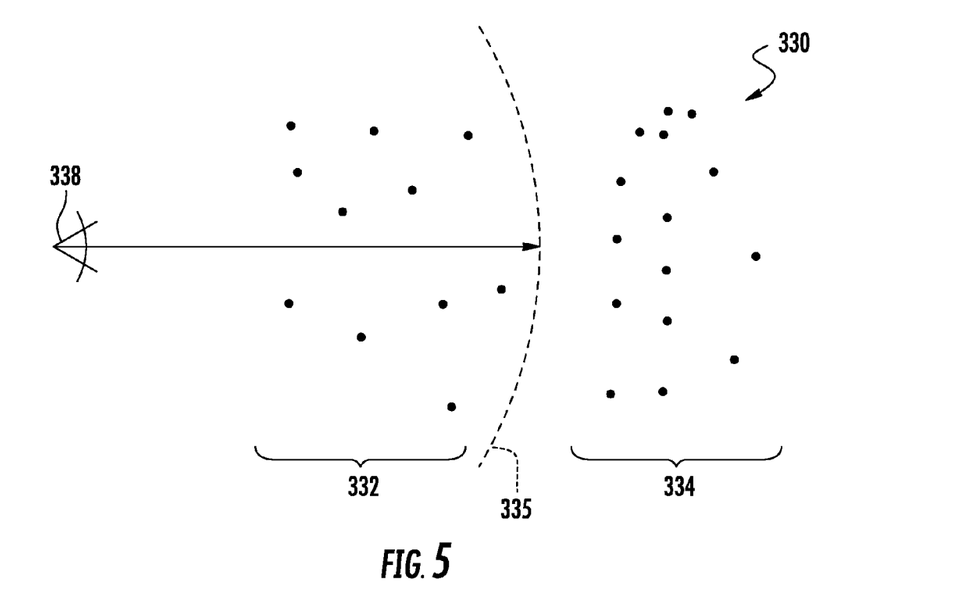
FIG. 5 depicts a representation of the identification of a subset of data points in a point cloud that are located at least a threshold distance from a camera perspective according to an embodiment of the present disclosure.

FIG. 5 depicts a representation of an example identification of a subset of data points in a point cloud that are located a threshold distance from a camera perspective according to an embodiment of the present disclosure. In particular, structure-from-techniques can be used to generate a point cloud 330 from geographic imagery data. The geographic imagery data can include imagery captured from a camera perspective 338. While only one camera perspective 338 is illustrated in FIG. 5, multiple camera perspectives can be associated with the geographic imagery data.

The point cloud 330 includes data points 332 that are within a threshold distance 335 of the camera perspective 338 and data points 334 that are located greater than the threshold distance 335 from the camera perspective. The data points 334 can be identified for inclusion in the subset. Certain of the data points 332 may be located greater than a threshold distance from a different camera perspective (not illustrated). Such data points can also be identified for inclusion in the subset. Data points that are not located greater than a threshold distance from any camera perspective can be excluded from the subset.

Other suitable criteria can be used in identifying data points for inclusion in the subset. For instance, the data points can be required to be located at least a threshold distance from multiple camera perspectives to be included in the subset. In addition and/or in the alternative, the data points can be required to be viewed from a variety of different view angles to be included in the subset. For instance, statistical analysis of viewsheds associated with the data points can be performed to determine whether to include the data points in the subset. The viewshed of a data point includes the set of points in the geographic area that view the data point. An example viewshed associated with a data point will be discussed in more detail below with reference to FIG. 8.

Figure 6:
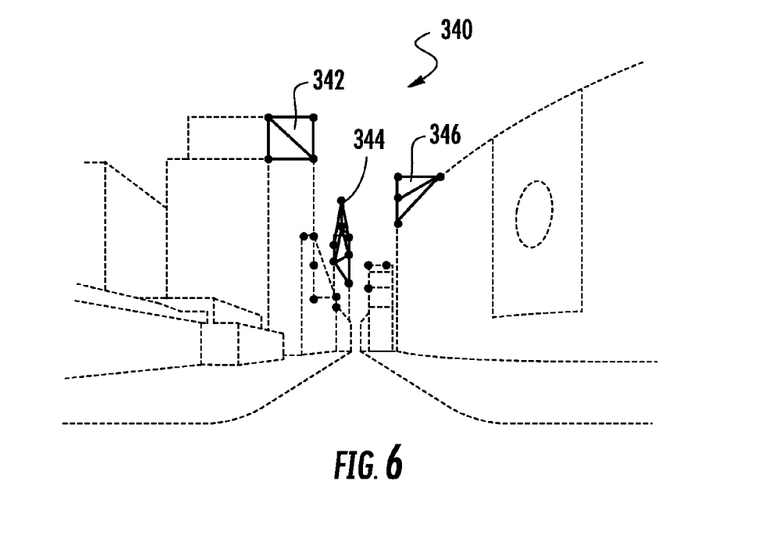
FIG. 6 depicts clustering of data points into point clusters according to an embodiment of the present disclosure.

Once the subset of data points has been identified, the method can optionally include clustering of the data points in the subset into one or more point clusters as shown at (208) of FIG. 2. Any suitable clustering technique can be used to cluster the data points. For instance, data points located spatially adjacent to one another and having similar pixel values can be clustered into a point cluster. FIG. 6 depicts a subset of data points 340 that have been clustered into point clusters 342, 344, and 346. The clustering of the data points into point clusters can facilitate matching of the data points in the subset with landmarks.

At (210) of FIG. 2, the method includes matching one or more of the data points in the subset (or point clusters if clustering of the data points is performed) with known landmarks in the geographic area. The known landmarks can be determined from a database of landmarks and other points of interest in a particular geographic area. The database can include information associated with the landmarks and other points of interest, such as geographic position of the landmarks, appearance of the landmarks, size of the landmarks, historical information, and other information. The one or more data points in the subset can be matched to the landmarks based at least in part on the information in the database. For instance, the position of a data point or point cluster in the subset can be determined to correspond with the position of a particular landmark as specified in the database. The data point can be matched to the landmark sharing the same or similar position.

For example, FIG. 6 depicts a point cluster 344 having a plurality of data points. Each of these data points can be associated with geographic position information. This geographic position information can be compared to the known geographic positions of landmarks in the geographic area as specified, for instance, in a database. The landmark 305 depicted in FIG. 3 can be associated with a geographic position that corresponds to the geographic positions of one or more of the data points in the point cluster 344 of FIG. 6. As a result, the point cluster 344, including its data points, can be matched with the landmark 305 depicted in FIG. 3. Other suitable techniques can be used to match the data points with landmarks without deviating from the scope of the present disclosure.

The landmarks matched with the one or more data points in the subset can be identified as prominent landmarks in a geographic information system as shown at (212) of FIG. 2. The identified prominent landmarks can then be used by a geographic information system for a variety of purposes as will be discussed in further detail below.

Prioritizing of Prominent Landmarks

An example aspect of the present disclosure is directed to prioritizing prominent landmarks in a geographic information system. It can be desirable to downselect and/or further refine the set of identified prominent landmarks to identify the most prominently visible landmarks in a geographic area. According to aspects of the present disclosure, a score can be computed for the prominent landmarks based on their visibility and other factors. The landmarks can be prioritized relative to other landmarks in the geographic information system based on the scores.

Figure 7:
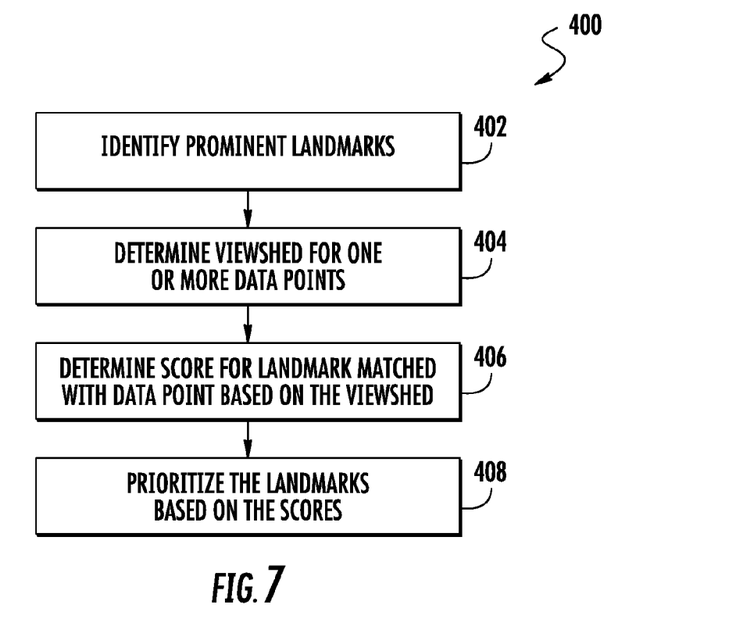
FIG. 7 depicts a flow diagram of a method for prioritizing prominent landmarks according to an embodiment of the present disclosure.

FIG. 7 depicts a flow diagram of a computer-implemented method (400) for prioritizing landmarks according to an embodiment of the present disclosure. The method (400) can be implemented by one or more computing devices, such as one or more of the computing devices depicted in FIG. 10. At (402), the method can include identifying prominent landmarks. For instance, prominent landmarks can be identified using the computer-implemented method (200) depicted in FIG. 2. In particular, a point cloud can be generated from geographic imagery data and landmarks can be matched to particular data points in the point cloud.

At (404) of FIG. 7, a viewshed is determined for a data point in the point cloud. The viewshed of a data point can be a set of points in the geographic area that can view the data point. According to particular aspects of the present disclosure, the viewshed can be approximated as the set of camera perspectives associated with the geographic imagery data that view the data point. In this way, the computation of the viewshed can be comparatively cheap when compared to determining viewsheds based on a full three-dimensional determination of visibility.

Figure 8:
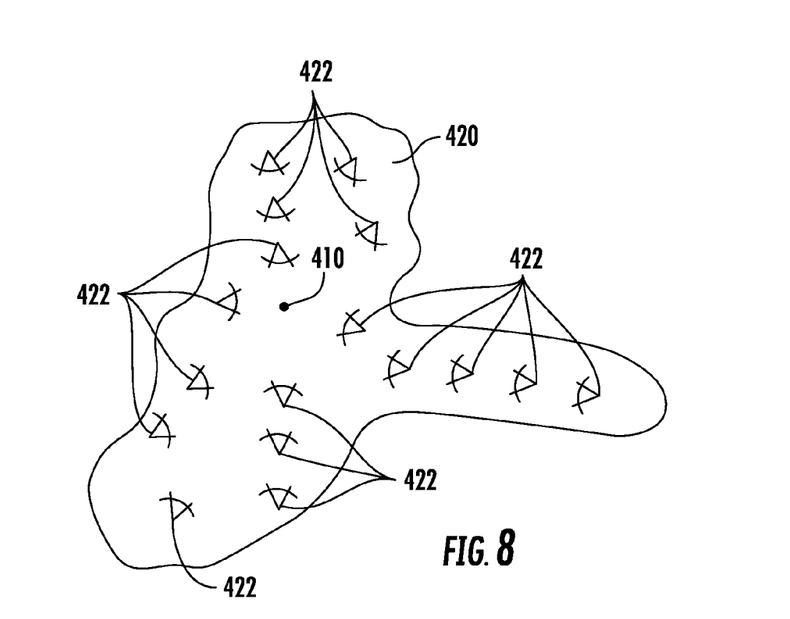
FIG. 8 depicts a two-dimensional representation of a viewshed according to an embodiment of the present disclosure.

FIG. 8 depicts a two-dimensional representation of a viewshed 420 for a data point 410 according to an example embodiment of the present disclosure. In particular, viewshed 420 can be the set of points in a geographic area that view the data point 410. The viewshed 420 can be approximated as the set of camera perspectives 422 associated with the geographic imagery data that view the data point 410.

At (406) of FIG. 7, a score for a landmark matched to the data point is determined based at least in part on the viewshed. Statistics can be calculated with regard to the set of camera perspectives in the viewshed to assess the visibility of the landmark. For instance, the score can be determined based on the number of camera perspectives that view the data point. In addition and/or in the alternative, geometric properties of the viewshed (e.g. area, distance of data point from centroid, etc.) can be used to determine the score for the landmark.

The score for the landmark can be determined based at least in part on other factors associated with the landmark in the geographic information system. For instance, the geographic information system can establish a landmark ranking independent of the visibility of the landmark to determine display priority and for other purposes in the geographic information system. This landmark ranking can be based on factors such as size, historical data, popularity, relevance to search queries, etc. The landmark ranking can be used to determine the score for the identified prominent landmarks. In this way, famous highly visible landmarks can receive higher scores than less-famous but highly visible landmarks.

At (408), the landmarks can be prioritized in the geographic information system based at least in part on the scores. For instance, the landmark rankings of landmarks in the geographic information system can be adjusted to favor landmarks with higher scores. In this way, the scores associated with the identified landmarks can enrich the data associated with the geographic information system.

Example Applications of Identified Landmarks in a Geographic Information System

The landmarks identified according to example aspects of the present disclosure can be used by a geographic information system for a variety of purposes. For instance, the prominent landmarks can be used in conjunction with providing travel directions. In particular, the geographic information system can refer to a particular prominent landmark when providing travel directions a user. Because the prominent landmarks can be identified based on data points that are visible from multiple different perspectives and from greater distances, the prominent landmarks can be particularly suitable for navigating a user through a geographic area because of the enhanced visibility of the landmark.

Figure 9:
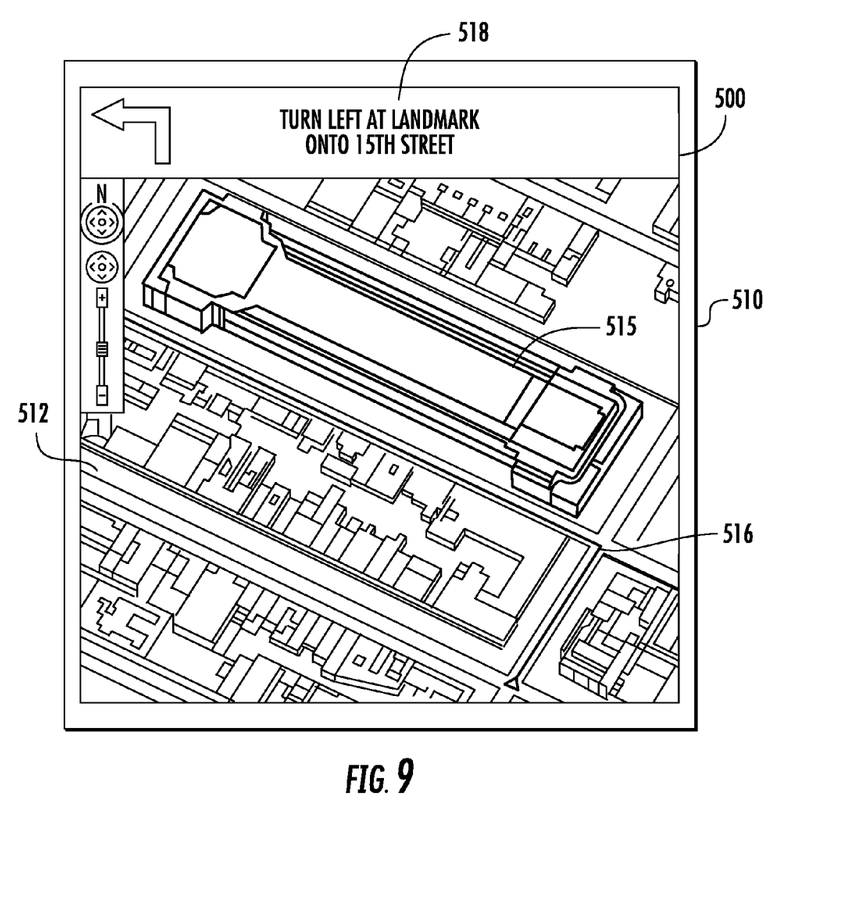
FIG. 9 depicts a user interface providing travel directions based at least in part on an identified landmark according to an embodiment of the present disclosure.

For instance, FIG. 9 depicts a user interface 500 for a geographic information system according to an embodiment of the present disclosure. The user interface 500 can be presented on the display 510 of a computing device. The user interface can present geographic imagery 512 of a geographic area in a viewport. The geographic imagery 512 can include travel directions 516 indicating a preferred route for navigation between an origin and a destination. The user interface 500 can also present a navigation recommendation 518 to the user. The navigation recommendation can recommend to the user to turn left at a particular landmark. The particular landmark selected for use in the navigation recommendation 518 can be a prominent landmark identified according to example aspects of the present disclosure.

In another embodiment of the present disclosure, the prominent landmarks can be rendered in an emphasized style relative to other landmarks in a representation of a geographic area presented by a geographic information system. For instance, the geographic information system can present a vector style map presenting vector representations of various landmarks in a geographic area. The vector representations associated with prominent landmarks identified according to example aspects of the present disclosure can be rendered in a bold or otherwise emphasized style relative to vector representations associated with other landmarks such that the prominent landmarks stand out in the representation of the geographic area. Any suitable style can be used to emphasize the vector representation of prominent landmarks relative to other vector representations without deviating from the scope of the present disclosure.

For instance, FIG. 9 depicts geographic imagery 512 depicted in a user interface 500 that includes vector style representations of landmarks. The vector representation of landmark 515 is rendered in an emphasized (e.g. bold) style relative to the vector representations of the other landmarks in the geographic imagery 512. The landmark 515 selected to be rendered in an emphasized style can be a prominent landmark identified according to example aspects of the present disclosure.

In yet another embodiment of the present disclosure, the prominent landmarks can be used to identify landmarks for constructing a three-dimensional model. Certain geographic information system can provide three-dimensional models of various landmarks and terrain in a geographic area. Three-dimensional models can sometimes be time intensive and/or computationally expensive to generate and/or display. Prominent landmarks identified according to example aspects of the present disclosure can be selected for creation and/or display of a three-dimensional model to enhance the appearance of the geographic imagery.

Example Computing Environments for Identifying Prominent Landmarks

Figure 10:
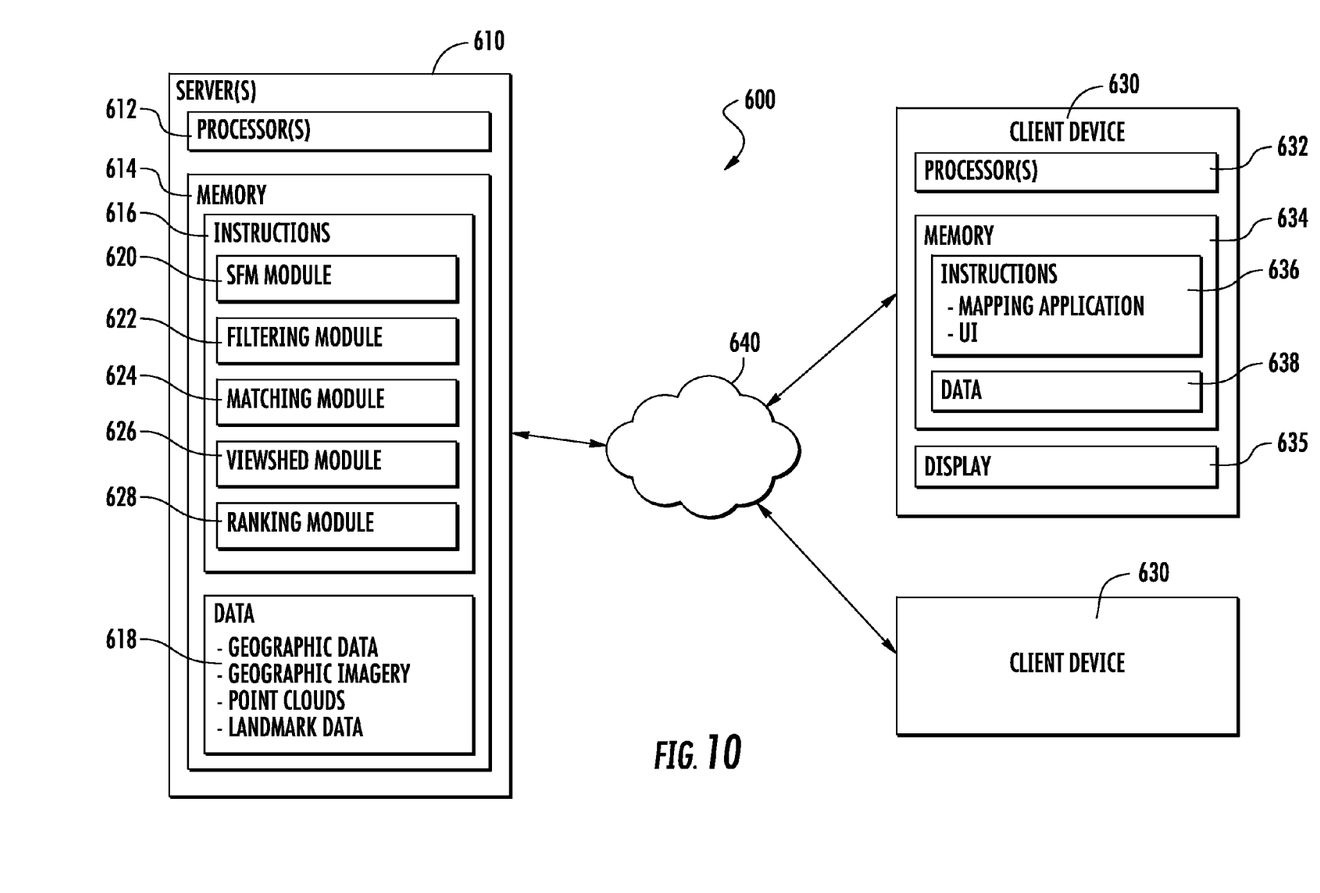
FIG. 10 depicts a computing environment for identifying prominent landmarks according to an embodiment of the present disclosure.

FIG. 10 depicts a computing system 600 that can be used to implement the methods and systems for identifying and prioritizing prominent landmarks according to example aspects of the present disclosure. The system 600 is implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can host a geographic information system. The server 610 can be implemented using any suitable computing device(s). The server 610 can have one or more processors 612 and a memory 614. The server 610 can also include a network interface used to communicate with one or more client devices 630 over a network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by the one or more processors 612, including instructions 616 that can be executed by the one or more processors 612. The instructions 616 can be any set of instructions that when executed by the one or more processors 612, cause the one or more processors 612 to provide desired functionality. For instance, the instructions 616 can be executed by the one or more processors 612 to implement a structure-from-motion (SFM) module 620, a filtering module 622, a matching module 624, a viewshed module 626, a ranking module 628 and/or other suitable modules.

The SFM module 620 can be configured to process geographic imagery data captured from one or more cameras to generate a point cloud including a plurality of data points. The filtering module 622 can be configured to identify a subset of data points in the point cloud located at least a threshold distance away from one or more camera perspectives associated with the geographic imagery data. The matching module 624 can be configured to match one or more data points in the subset with a landmark. The viewshed module 626 can be configured to determine a viewshed for one or more data points in the subset. The ranking module 628 can be configured to determine a score for a landmark based at least in part on the viewshed of a data point associated with the landmark.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. When software is used, any suitable programming language or platform can be used to implement the module.

Memory 614 can also include data 618 that can be retrieved, manipulated, created, or stored by the one or more processor 612. The data 618 can include geographic data such as landmark data and geographic imagery data. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 10, any number of client devices 630 can be connected to the server 610 over the network 640. The client devices 630 can be any suitable type of computing device, such as a general purpose computer, special purpose computer, laptop, desktop, mobile device, smartphone, tablet, wearable computing device, a display with one or more processors, or other suitable computing device.

Similar to the server 610, a client device 630 can include one or more processor(s) 632 and a memory 634. The one or more processor(s) 632 can include one or more central processing units (CPUs), graphics processing units (GPUs) dedicated to efficiently rendering images, and or other processing devices. The memory 634 can store information accessible by the one or more processors 632, including instructions 636 that can be executed by the one or more processors 632 and data 638. For instance, the memory 634 can store instructions 636 for implementing a user interface and a mapping application for a geographic information system The client device 630 can include various input/output devices for providing and receiving information from a user, such as a touch screen, touch pad, data entry keys, speakers, and/or a microphone suitable for voice recognition. For instance, the client device 630 can have a display 635 for presenting geographic imagery of a geographic area to a user.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for identifying prominent landmarks in a geographic area, the method comprising:
   accessing, by the one or more computing devices, geographic imagery data captured from one or more cameras from a perspective at or near ground level;
   generating, by the one or more computing devices, a point cloud based at least in part on the geographic imagery data, the point cloud comprising a plurality of data points, each of the plurality of data points associated with a tracked feature in the geographic imagery data;
   identifying, by the one or more computing devices, a subset of data points in the point cloud, each data point in the subset located at least a threshold distance away from one or more camera perspectives associated with the geographic imagery data; and
   matching, by the one or more computing devices, one or more data points in the subset of data points with a landmark;
   determining, by the one or more computing devices, a landmark ranking for the landmark based at least in part on the one or more data points; and
   providing, by the one or more computing devices, travel directions in response to a request for travel directions, wherein the travel directions comprise data indicative of one or more landmarks identified based at least in part on the landmark ranking.

2. The computer-implemented method of claim 1, wherein the landmark is selected for use in providing travel directions.

3. The computer-implemented method of claim 1, wherein the landmark is selected for rendering in an emphasized style in a representation of a geographic area.

4. The computer-implemented method of claim 1, wherein the landmark is identified for construction of a three-dimensional model.

5. The computer-implemented method of claim 1, wherein the point cloud is generated by the one or more computing devices using a structure-from-motion technique.

6. The computer-implemented method of claim 1, wherein matching, by the one or more computing devices, one or more data points in the subset of data points with a landmark comprises:
   clustering, by the one or more computing devices, one or more data points in the subset of data points into a point cluster; and
   matching, by the one or more computing devices, the point cluster with the landmark.

7. The computer-implemented method of claim 1, wherein the geographic imagery data comprises street level images captured by the camera at a perspective associated with a ground level.

8. The computer-implemented method of claim 1, wherein the method comprises determining, by the one or more computing devices, a viewshed associated with the one or more data points in the subset of data points.

9. The computer-implemented method of claim 8, wherein the viewshed for each of the one or more data points in the subset of data points comprises a set of camera perspectives associated with the geographic imagery data that view the data point.

10. The computer-implemented method of claim 8, wherein the method comprises determining, by the one or more computing devices, a score for the landmark based at least in part on the viewshed determined for the one or more data points.

11. The computer-implemented method of claim 10, wherein the score for the landmark is determined, by the one or more computing devices, based at least in part on a landmark ranking associated with the landmark in a geographic information system.

12. The computer-implemented method of claim 10, wherein the score is used to prioritize landmarks for display in a geographic information system.

13. One or more tangible, non-transitory computer-readable media storing computer-readable instructions that when executed by one or more processors cause the one or more processors to perform operations, the operations comprising:
   accessing geographic imagery data captured from one or more cameras from a perspective at or near ground level;
   generating a point cloud based at least in part on the geographic imagery data using a structure-from-motion technique, the point cloud comprising a plurality of data points, each of the plurality of data points associated with a tracked feature in the geographic imagery data;
   identifying a subset of data points in the point cloud, each data point in the subset of data points located at least a threshold distance away from one or more camera perspectives associated with the geographic imagery data; and
   matching one or more data points in the subset of data points with a landmark;
   determining a landmark ranking for the landmark based at least in part on the one or more data points; and
   providing travel directions in response to a request for travel directions, wherein the travel directions comprise data indicative of one or more landmarks identified based at least in part on the landmark ranking.

14. The one or more tangible, non-transitory computer-readable media of claim 13, wherein the operations comprise:
   determining a viewshed associated with the one or more data points in the subset of data points, the viewshed for each of the one or more data points in the subset of data points comprising a set of camera perspectives associated with the geographic imagery data that view the one or more data points; and
   determining a score for the landmark based at least in part on the viewshed determined for the one or more data points.

15. The one or more tangible, non-transitory computer-readable media of claim 13, wherein the operation of matching one or more data points in the subset of data points with a landmark comprises:
   clustering one or more data points in the subset of data points into a point cluster; and
   matching the point cluster with the landmark.

* * * * *